United States Patent [19]
Kernick et al.

[11] 3,921,038
[45] Nov. 18, 1975

[54] STATIC SURGE-CURRENT LIMITER
[75] Inventors: Andress Kernick, Murrysville; John Rosa, Pittsburgh, both of Pa.; David L. Bowles, Lima, Ohio
[73] Assignee: Westinghouse Electric Corporation, Pittsburgh, Pa.
[22] Filed: Feb. 19, 1974
[21] Appl. No.: 443,875

[52] U.S. Cl. ............... 317/33 SC; 317/20; 321/14; 321/45 C
[51] Int. Cl.$^2$ ........................................ H02H 7/10
[58] Field of Search .......... 317/20, 23, 33 SC, 33 R, 317/31, 52; 321/14, 45 C; 323/24

[56] References Cited
UNITED STATES PATENTS

| | | | |
|---|---|---|---|
| 3,098,949 | 7/1963 | Goldberg | 317/31 |
| 3,558,982 | 1/1971 | Greenwood | 317/20 |
| 3,558,983 | 1/1971 | Steen | 317/20 |
| 3,723,816 | 3/1973 | Pollard | 317/20 |
| 3,725,742 | 4/1973 | Pollard | 321/45 C X |
| 3,737,759 | 6/1973 | Pollard | 321/45 C |
| 3,763,418 | 10/1973 | Beck et al. | 321/45 C |
| 3,794,885 | 2/1974 | Kishi et al. | 321/45 C X |
| 3,823,343 | 7/1974 | Steen | 317/23 X |

Primary Examiner—J. D. Miller
Assistant Examiner—Patrick R. Salce
Attorney, Agent, or Firm—M. J. Moran

[57] ABSTRACT

A solid state or static current limiter which provides a relatively low impedance electrical current conducting path between a source of power and a load or between two interconnected sources or networks during non-overload conditions. The main current carrying device comprises a thyristor or similar gated element which is shunted by an auxiliary circuit which includes a capacitive element, a controlled thyristor and an inductance element. The capacitive element is shunted by a current limiting circuit which cooperates with the capacitive element to limit current in the load once the main current carrying thyristor has been turned off and the current flowing there-through has been commutated into the auxiliary circuit as when an overload or short circuit condition has been sensed in the load. The rate of turnoff of the main thyristor is limited primarily by the inductive element in the auxiliary circuit. The inductive element need not carry appreciable load current for an extended period of time as the main current limiting function for the circuit is provided by forward biasing a diode which is connected in series with a current limiting capacitor shortly after the main thyristor has been turned off.

14 Claims, 20 Drawing Figures

STATIC SURGE-CURRENT LIMITER

BACKGROUND OF THE INVENTION

This invention relates generally to current limiting devices and in particular to static forced commutation current limiting devices.

Static current limiting devices such as the type described in U.S. Pat. No. 3,558,982 issued to Allen N. Greenwood on Jan. 26, 1971 are known. In the latter patent a device is described which contains a thyristor which is controllable to sense overload current in a load to be protected. The thyristor is shunted or bypassed by a switching circuit which is used generally exclusively for turning the thyristor off during an overload condition and commutating the overload current which is flowing therethrough into another separate current limiting circuit. The switching or commutating circuit is controlled with a similar thyristor or silicon controlled rectifying device which is to be fired in sequence with the sensing of overload current in the load. A third circuit, which is in parallel with the thyristor, but separate from the commutating circuit, comprises another silicon controlled rectifier or thyristor which is also to be fired in sequence to provide a high impedance load to the current for current limiting purposes once the main circuit has been turned off or open by the action of the commutating circuit. In this arrangement three thyristor circuits must be controlled simultaneously from a programming source. This of course presents the problem of synchronization. It would be advantageous if the problem of synchronization could be avoided or reduced. It would also be advantageous to replace at least one of the active controlled switching elements with a passive switching element which would react automatically to cause the introduction of current limiting impedance into the current path without necessitating reliance upon a programming device. It would also be advantageous to provide a current limiting operation where voltage transients are suppressed.

SUMMARY OF THE INVENTION

In accordance with the invention a current limiting device is provided which is useful for bidirectional and/or unidirectional current limiting applications. In a simplified form the invention comprises a main thyristor disposed in circuit relationship between a source of energy and a load. This main current carrying thyristor is shunted or bypassed by a normally off thyristor which has connected in series circuit relationship therewith a storage capacitive element and an inductive element. The storage capacitive element is chargeable from a separate source and the thyristor element is controllable according to load conditions which are separately sensed by an external means. In one embodiment of the invention the storage capacitive element is bypassed or shunted by a passive diode element rather than a controlled thyristor or silicon controlled element as in the prior art. This latter passive element is connected in series circuit relationship with a second capacitive element and a resistive element. The former storage capacitive element is chargeable in a given direction by a separate source of electrical power. In this embodiment of the invention when an overload condition is sensed in the load the second thyristor element is fired thus causing the first or former storage capacitive element to provide a reverse voltage across the anode to cathode terminal of the main thyristor element. This has the effect of turning the main thyristor element off and commutating the current which is flowing therethrough into the commutating circuit comprising the second thyristor element, the second storage capacitive element and the inductive element. The inductive element limits the current rise in the commutating circuit so as to protect the second thyristor element from damage. After a short period of time the capacitive element discharges to zero voltage while the overload or short circuit current continues to increase slightly. Once the storage capacitive element has discharged to zero voltage and begins to charge in the opposite direction, the diode element is forward biased to thereby connect the second capacitive element and the series resistor in parallel circuit relationship with the first capacitive element thus quickly providing a second path for the load current and thus assisting the first capacitive element in limiting the overload current before natural commutation of the overload current occurs. In this embodiment of the invention the inductive element which is in series with the first storage capacitive element is utilized primarily during the transient period of operation when the main thyristor is changing state to prevent a large voltage value from being impressed thereacross which could destroy or damage the main thyristor. In another embodiment of the invention the circuit which shunts or bypasses the main storage capacitive element does not include another capacitive element but does include a diode element and a resistive element. In this embodiment of the invention the current limiting operation is not as abrupt because a second capacitive element is not present to provide a back EMF for limiting current flow while it is being charged by the overload current. The effect of this is not merely to limit current but also to sustain it in a limited state until the next natural current zero or commutation value occurs so that other peripheral, and perhaps slower acting circuit protective equipment such as a mechanical circuit breaker may react to also protect the load or other circuit elements. In a third embodiment of the invention the single passive diode element is replaced with a complete passive diode bridge having as one part thereof the secondary of a transformer which is useful for charging the main storage capacitive element during that portion of the operating duty cycle of the current limiter when the main circuit is not conducting. Such a case occurs in AC operation where two main circuit thyristors are connected in parallel opposite relationship with respect to each other to conduct alternate half cycles of circuit load current. Though the bridge diode transformer secondary is useful in charging the main storage capacitive element it has very little detrimental effect on the circuit during a current limiting operation as the diodes of the bridge circuit act to conduct the overload current to bypass the transformer secondary.

BRIEF DESCRIPTION OF THE DRAWINGS

For better understanding of the invention reference may be had to the preferred embodiments exemplary of the invention shown in the accompanying drawings in which.

DESCRIPTION OF THE PREFERRED EMBODIMENTS

Figure 1:
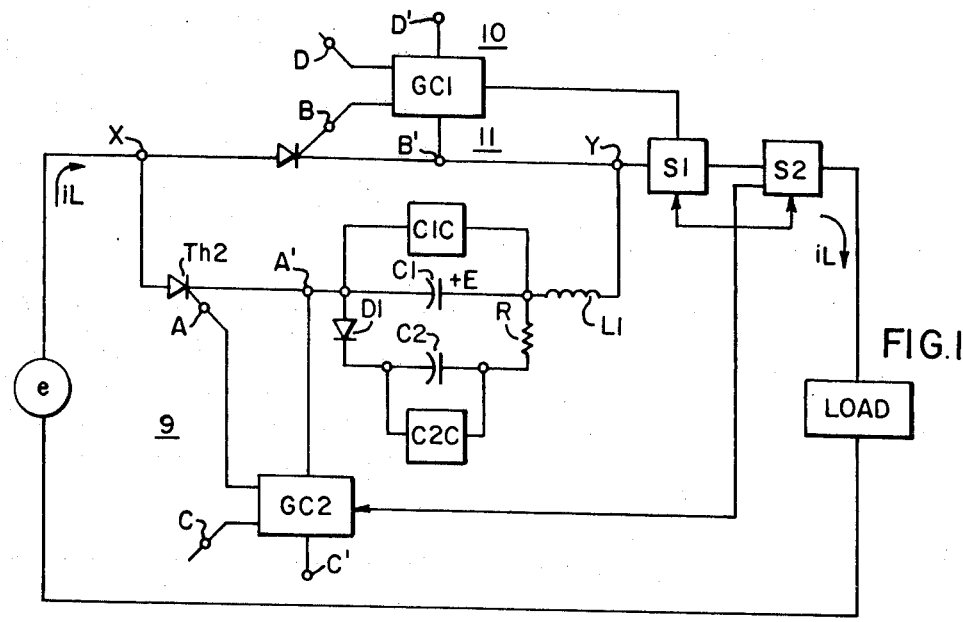
FIG. 1 shows a circuit schematic diagram of one embodiment of the invention for limiting unidirectional current.

Referring now to the drawings and FIG. 1 in particular, a portion of a static surge current limiting device or interrupter 9 is shown. This device may be utilized in either an alternating current or direct current limiting application. A source of voltage e is shown for providing electrical current iL to an electrical LOAD. Under certain circumstances the current iL may increase to a maximum value during overload or short circuit conditions which may be sufficient to damage the load, the source e or any other electrical equipment, now shown, connected in the circuit. A static surge current limiting interrupter 10 is provided in the circuit between the teriminals X and Y to limit the current iL under overload or short circuit conditions to prevent damage to the source e, the LOAD or other circuit equipment. The surge current limiting device 10 includes a main electrically conducting circuit connected between the terminals X and Y having a thyristor Th1 therein which is controlled at its gate by the B terminal of a gate control device GC1. In this embodiment of the invention current is only conducted unidirectionally, i.e. from terminal X to terminal Y. However, as will be shown with respect to FIG. 2 a similar static surge current limiting interrupter portion 10' may be provided between terminals X and Y to conduct electrical current in the other direction and thus make the device of FIG. 1 operable for alternating electrical current, i.e. current which may alternately flow in both directions between terminals X and Y and in the load. When the thyristor Th1 is gated on, electrical current may flow from the source of voltage or power e through the terminal X into and through the thyristor Th1, into the terminal Y and from thence to the load and back to the source e. Also connected in circuit relationship with the terminals X and Y and generally in parallel with the thyristor Th1 is a commutating circuit which comprises a second thyristor or gated device Th2. The anode of the thyristor Th2 is connected to the terminal X and the cathode thereof is connected to one terminal or side of a capacative element C1. The other terminal or side of the capacitive C1 is connected to one side or terminal of an inductive element or choke coil L1, the other side or terminal of the choke coil L1 is connected to the terminal Y. Connected in parallel circuit relationship with the capacitive element C1 is a charging circuit C1C for charging the capacitive element C1 under certain circuit conditions to a voltage value +E where the positive terminal of the capacitive element C1 is closer to terminal Y than the negative terminal is. The gate of the thyristor or gated device Th2 is connected to terminal A of a gate control circuit GC2. Connected in parallel circuit relationship across the capacitive element C1 is a current limiting circuit comprising a diode or passive diode element D1 the anode of which is connected to the cathode of the thyristor Th2. The cathode of the diode D1 is connected to one side or terminal of a means for limiting electrical current or capacitive element C2. The other side or terminal of the latter means or capacitive element C2 is connected to one end of resistive element R the other end of which is connected to the junction between the storage capacitive element C1 and the inductive element L1. The input to the gate control circuit GC1 is connected to a circuit status sensing element S1 which is connected in the line in circuit relationship with the load to sense the status of the current or voltage in the circuit to thus cause gating of the thyristor Th1 at an appropriate time. In a like manner the input terminal of the gate control circuit GC2 is connected to a similar circuit status sensing device S2 which is connected in circuit relationship with the load for sensing the status of the current or the voltage in the circuit for thus causing the thyristor element Th2 to be actuated to an on state at an appropriate time. The sensors S1 and/or S2 may sense the rate of change of current with respect to time and/or the maximum value of current flowing in the load at any time. In the previously described current limiting circuit 10 the gate controlled elements GC1 and GC2 may have dual outputs for controlling two circuits simultaneously. As an example the B output terminal of the control circuit GC1 may be connected to the gate of the thyristor Th1 as previously described while the D output terminal is connected to the corresponding gate terminal of a thyristor Th1' shown in FIG. 2. In a like manner the A output terminal of the control circuit GC2 may be connected to the gate of the thyristor Th2 as previously described while the C output terminal is connected to the gate of the thyristor Th2' shown in FIG. 2.

Figures 2, 3, 4:
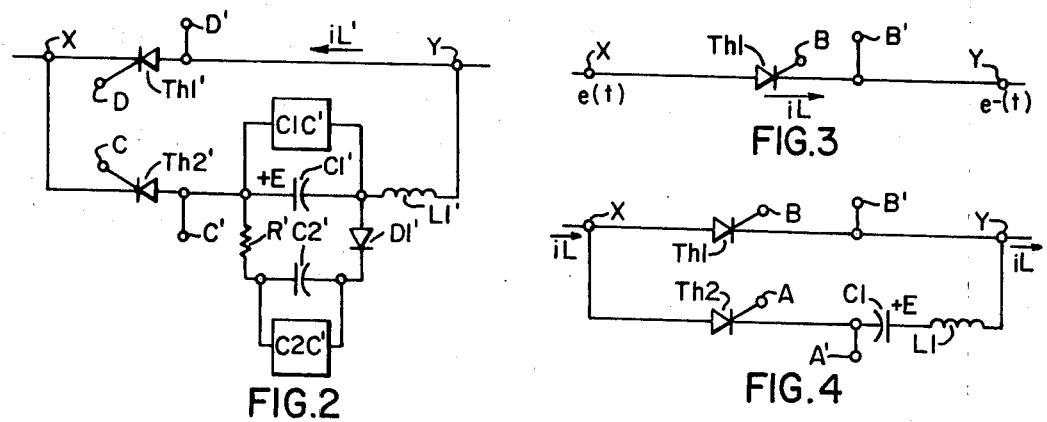
FIG. 2 shows an electric circuit schematic diagram for use with the circuit of FIG. 1 to provide an embodiment of the invention for use for limiting bidirectional current.
FIG. 3 shows a portion of the circuit of FIG. 1.
FIG. 4 shows a portion of the circuit of FIG. 1 during part of the current commutating operation.

Referring now to FIG. 2 a current limiting device 11' adaptable for use with the current limiting device 10 shown in FIG. 1 for bidirectional current limiting is depicted. The terminals X and Y of FIG. 1 are shown in the appropriate places of FIG. 2. According to one embodiment of the invention the current limiting circuit 11 of FIG. 1 and the current limiting circuit 11' of FIG. 2 may be used together for an alternating or bidirectional current limiting network. In other embodiments of the invention either the unidirectional current limiting device 11 or the unidirectional current limiting circuit 11' may be used alone without the other. For purposes or simplicity in describing the operation of the current limiting device 10, presume that the current limiting circuit 11 shown in FIG. 1 is the only circuit to be controlled to limit current. It is to be understood that in some embodiments of the invention such as those used with bidirectional current, the circuit 11' may be connected to the appropriate terminals X-Y and the firing of the thyristors Th1 and Th1' may be alternated to accommodate the change in direction of the main load current.

Referring once again to FIG. 1 and presuming that the source of voltage e and the current iL are alternating, for example, at 60 hertz, and persuming that the current iL is flowing in the direction indicated by the arrows, sensor S1 will be actuated to cause the gate control circuit GC1 to energize the gate terminal B of the thyristor Th1 to provide a relatively low impedance path between the terminals X and Y for current flowing in the load when an overload or short circuit occurs. At this time the thyristor Th2 is not conducting and consequently the conducting circuitry between terminals X and Y may be depicted by viewing FIG. 3.

In FIG. 3, it is seen that the thyristor TH1 is gated on and the load current iL is flowing from the X terminal to the Y terminal.

Referring once again to FIG. 1 presume that load current iL begins to rise rapidly towards a value which is significantly above or approaching the maximum value of current i1 that the source, distribution means and/or load can or should conduct without being damaged. The sensor S2 will sense the oncoming overload or short circuit condition, for example by sensing the rate of change of current with respect to time, ($di/dt$) and provide a signal to the gate control circuit GC2 causing the thyristor Th2 to be actuated. Note that at this time thyristor Th2 is forward biased and therefore ready for conduction when gated on. Also note that the diode D1 is reverse biased by the charge on the capacitor or capacitive element C1 which has been previously charged by the charging circuit C1C to place a voltage thereacross which is at this time in polarity opposition to the conducting mode of the diode D1. At the instant Th2 is gated on, an increasing portion of the load current iL will begin to flow in the circuit comprising thyristor Th2, capacitive device C1 and inductive element L1, and a correspondingly decreasing portion of iL will flow through thyristor Th1, until the current through Th1 ceases to flow altogether. Simultaneously the voltage across the capacitive element C1 is impressed across the anode and cathode terminals of the thyristor Th1 to reverse bias that thyristor. The inductive element L1 is provided to limit the rate of rise of current iL through thyristor Th2 to a safe value for allowing the thyristor element Th2 to completely turn on before excessive current flow therethrough is begun. In one embodiment of the invention 5 microseconds of time are necessary for the thyristor element Th2 to be completely turned on to conduct current through its entire cross-section if the current to be conducted is approximately 500 amps. It should be noted that the inductive element L1 is not provided for limiting the current iL and causing current commutation, as other circuit elements are present in the circuit 11 to provide this characteristic and effect.

Referring now to FIG. 4, the schematic diagram of the circuitry between points X and Y of FIG. 1 is shown after a sufficient increase in the value of load current iL has occurred to cause sensor S2 to actuate gate control circuit GC2 to fire or actuate thyristor Th2 to the on or conducting condition. As thyristor Th2 begins to conduct the electrical current which is flowing through thyristor Th1, begins to commutate through thyristor Th2. This is due to the loop current that flows from the capacitive element C1 into the cathode of the thyristor element Th1 tending to cause it to turn off. The presence of the inductive element L, as was previously mentioned, limits the rate of rise of current flowing through the thyristor Th2.

Figures 5, 10:
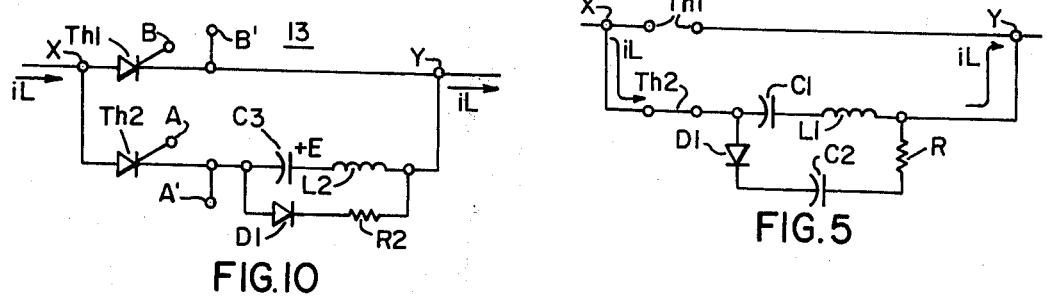
FIG. 5 shows a portion of the circuit of FIG. 1 which is similar to that shown in FIG. 4 after current commutation has begun.
FIG. 10 shows a circuit diagram of another embodiment of the invention.

Referring now to FIG. 5 a schematic diagram of the circuit between terminals X and Y of FIG. 1 is shown after the thyristor Th2 has been turned on and the thyristor Th1 has been turned off. The capacitive element C1 will reverse bias thyristor Th1, and continue to discharge through the inductive element L into the terminal Y while conducting load current iL. During this phase of the operation, the current flowing between terminals X and Y is likely to actually increase. However, once the capacitive element C1 has zero voltage impressed thereacross, and begins to charge positively on the opposite terminal than was previously charged positively, the diode D1 will conduct introducing a second capacitive element C2 and a series connected resistive element R in parallel in the circuit with the original capacitive element C1. The two capacitors (C1 and C2) connected in parallel act as the one capacitive element providing a different impedance to the flow of overload or short circuit current iL. This causes current limitation by providing a back EMF to the flow of overload current as the left sides of both capacitors become charged providing a positive voltage which tends to limit the current flowing therethrough. In addition the resistive element R is added to absorb part of the energy stored in L and the stray inductances of the circuit, and thereby limit the voltage to which capacitors C1 and C2 will ultimately charge, with the final objective of damping the voltage transient across the thyristor Th1. The capacitive element C1 also limits the rate of forward voltage rise (volts per microsecond) across the thyristor Th1. With the two capacitive elements C1 and C2 connected in parallel, the load current iL tends to charge both capacitive elements to provide a sufficient back EMF to quickly limit the flow of current between the terminals X and Y thus causing a reduction of that current to zero before a natural current zero would normally occur.

Figure 6:
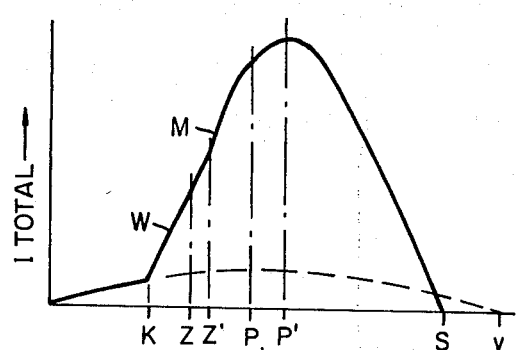
FIG. 6 shows a plot of total interrupter current versus time during a current commutating and limiting operation.
Figure 7:
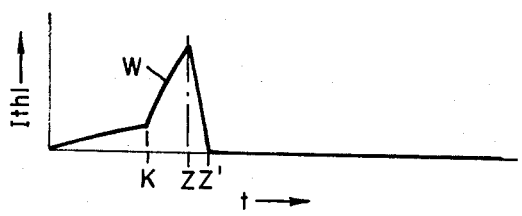
FIG. 7 shows a plot of current flow in the main circuit of FIG. 1 versus time during a time corresponding to the time of FIG. 6.
Figure 8:
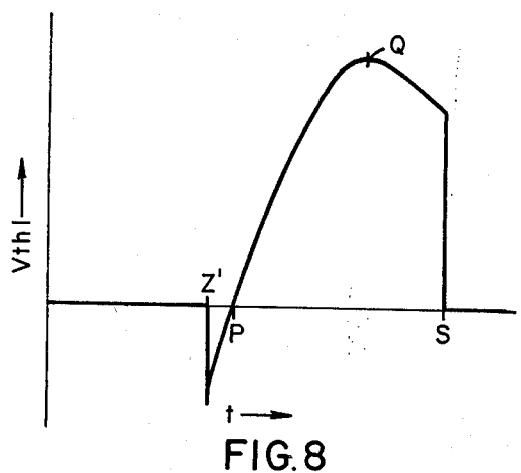
FIG. 8 shows a plot of the main current thyristor voltage versus time during a time corresponding to the time of FIGS. 6 and 7.

Referring now to FIGS. 6, 7, 8 and 9, plots of selected circuit currents and voltages versus time are shown. In FIG. 6 a plot of total current iL between the terminals X and Y versus time is shown. In FIG. 7 a plot of the current flowing through thyristor Th1 versus time is shown. In FIG. 8 a plot of the voltage across the anode and cathode of thyristor Th1 versus time is shown and in FIG. 9 a plot of the current through the thyristor Th2 versus time is shown. All plots are for one-half cycle of 60 hertz current flow. However it is to be understood that the plots of the later figures are not limiting.

As can be seen by reference to FIG. 6 the total current flowing between the terminals X and Y begins at zero for a half cycle and follows a normal sinusoidal shape to the point K at which time a fault presumably occurs which causes the load current to begin to rise at a high rate along a plot generally designated W. It will be noted that in the plot of thyristor current versus time (FIG. 7) that the shape of the curve is exactly the same as the shape for the total current (FIG. 6) because thyristor Th1 is the only circuit path which is conducting electrical current during this time interval. However, at point Z thyristor Th2 is turned on in a manner previously described and the current flowing therethrough rises rapidly until it equals the value of the current flowing between terminals X and Y. This is demonstrated by the curve of FIG. 9. At the same time, the current through the thyristor Th1, as is shown by the FIG. 7, quickly drops to 0 amps. The total rise or fall time as the case may be, is approximately 5 microseconds and in that time, which is at least partially controlled by the inductive element L, the overload current iL commutates from the thyristor Th1 to the thyristor Th2. It will be noted that after this time the short circuit or overload current iL shown by that part of FIG. 6 designated M continues upwardly toward the value of current designated at time P of FIG. 6. The slope gradually changes as the capacitive element C1 completely discharges and at point P the capacitive element C1 has been completely discharged to a value of 0 volts and as can be noted by reference to FIG. 8 the voltage across the thyristor changes from negative voltage which is useful in reverse biasing the thyristor Th1 to 0 volts. At 0 volts the diode D1 becomes forward biased and provides added capacitance by way of capacitive element C2 for limiting the overload current iL. At the point Q (shown in FIG. 8) the total current iL begins to diminish in value due to the opposing EMF developing across the two capacitive elements C1 and C2 connected in parallel circuit relationship and the effective resistive element R. It should be noted that the voltage across thyristor element Th1 (FIG. 8) continues to rise even after the total current flowing in the circuit between terminals X and Y begins to diminish at point P. After the total current iL has begun to diminish, the voltage across the thyristor element Th1 begins to go to a lower value and by the time it is reduced to zero, at point S it follows the natural shape of the voltage curve of the circuit voltage source which is generally out of phase with the current. At point S the sensors S1 and S2 have cooperated to prevent the thyristor Th1' from firing to conduct the current for the next half cycle in the opposite direction. It should be noted with respect to FIG. 6 that the current iL has been reduced to zero at the point S long before natural current reversal would have occurred at point U.

Referring now to FIG. 10 another embodiment of the invention is shown which is adaptable for alternating current power source sustained current limiting. Presume the circuitry of FIG. 1 is present external to the terminals X and Y. The source of voltage is e, (not shown), there are terminals X and Y between which is connected the current limiting device 13. There is present a thyristor Th1 having the anode thereof connected to the terminal X and the cathode thereof connected to terminal Y, the gate thereof is connected to the gate terminal B of a gate control circuit GC1, the input of which is connected to a sensor S1 in a manner previously described. In addition there is a load and a sensor S2 the output of which is connected to the input of a gate control circuit GC2. Load current iL flows through the load and is produced by the source e. Also connected between terminals X and Y is a second thyristor Th2 where the anode thereof is connected to the terminal X and the cathode thereof is connected to one side of the capacitive element C3. The other side of the capacitive element C3 is connected to an inductive element L2 where the inductive element L2 may be different than the inductive element L1 shown in FIG. 1. The other end of the inductive element L2 is connected to the terminal Y. Connected across the capacitive element C3 is a series circuit combination including diode element D1 and a resistive element R2, the resistive element R2 may be of a different resistive value than the resistive element R shown in FIG. 1. Note that capacitive element C3 is precharged to a voltage value +E in a manner similar to that shown in FIG. 1 capacitive element C1. Primarily the circuit operates in a manner similar to the operation of the circuit shown in FIG. 1. That is, main load current iL flows through the normally turned on thyristor Th1 and through sensors S1, S2 and a load. If a fault is sensed, the sensor S2 actuates the gate control circuit GC2 (not shown) which in turn fires or turns on the thyristor element Th2. When that happens the capacitive element C3 is connected in parallel circuit relationship across the thyristor element Th1, through the inductive element L2 which acts as a current rate of rise control element. As the result of the precharged condition of the capacitive element C3 to voltage E, it will tend to turn off the thyristor Th1 and commutate the current iL therefrom into thyristor element Th2 with the inductive element L2 acting as a limit for the rate of rise of the current through the thyristor element Th2. Inductive element L2 does not act generally to limit current.

Figures 11, 12, 13:
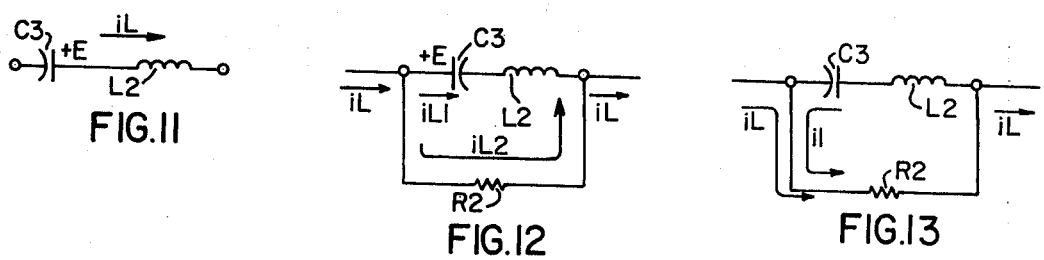
FIG. 11 shows current flow through the storage capacitive element of FIG. 10 after commutation has begun.
FIG. 12 shows current flow through the storage capacitor and resistive element of FIG. 10 at a greater time after current commutation has begun.
FIG. 13 shows current flow through the resistive element of FIG. 10 at a still greater time after commutation has begun.

Referring to FIG. 11 a view of capacitive element C3 with current flowing therethrough equal to iL is shown. After the capacitive element C3 completely discharges it will begin to be charged in the opposite direction by the current iL and assume an opposite voltage polarity of sufficient magnitude to forward bias the diode D1 thus providing dual paths for the flow of current iL as is shown in FIG. 12. Gradually the capacitive element C3 will become so fully charged that the voltage provided thereacross will prevent any more current from flowing therethrough and substantially all of the electrical current iL will bypass the capacitive element C3 and flow through the resistive element R2 as is shown in FIG. 13. After this instant capacitive element C3 begins to discharge through R2. During the time span of operation of the elements of FIGS. 11–13, it will be noted that the current limiting impedance provided by the circuit of FIG. 10 is due partially to the capacitive element C3 which provides a back EMF which is current limiting in nature and partially to the resistive element R2 which is also current limiting. More importantly, however, the resistive element R2 allows overload or short circuit current iL to continue to flow after it has been limited until the natural reduction thereof at the next current zero. This sustaining of limited overload current iL at regulated overload or short circuit conditions allows slower acting mechanical or other circuit protecting devices which may be elsewhere in the electrical system to react to the presence of the overload current iL to thereby trip or do whatever is necessary to provide further circuit protection. Therefore, the circuit of FIG. 10 may be characteristically described as limiting but sustaining for overload or short circuit currents.

Figure 14:
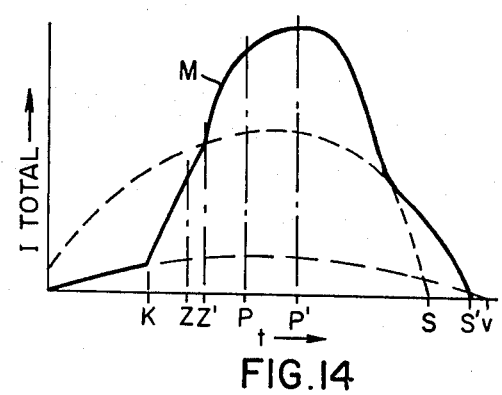
FIG. 14 shows the plot of total interrupter current versus time for the circuit of FIG. 10 during a current limiting operation.
Figure 15:
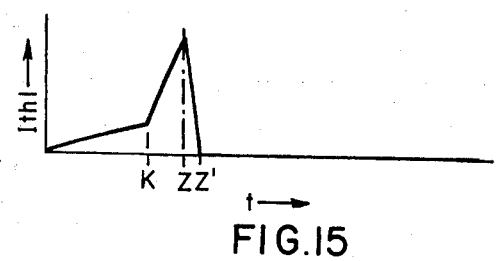
FIG. 15 shows a plot current flow in the main path for the circuit of FIG. 10 versus time during the time increment shown in FIG. 14.
Figure 16:
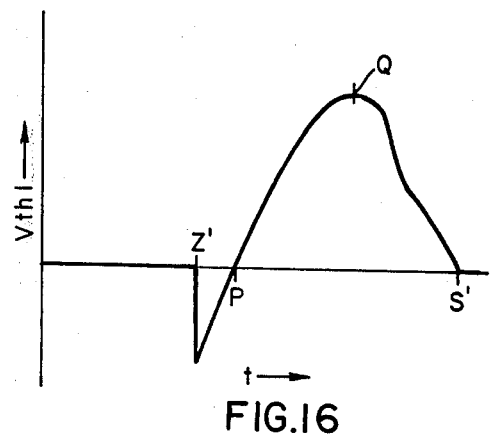
FIG. 16 shows a plot of the main current path thyristor voltage versus time for the circuit of FIG. 16 during the time increment of FIGS. 14 and 15.
Figure 9:
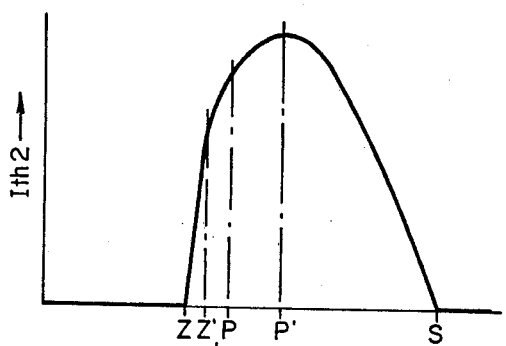
FIG. 9 shows a plot of the commutating and limited current during a time corresponding to the time of FIGS. 6, 7 and 8.
Figure 17:
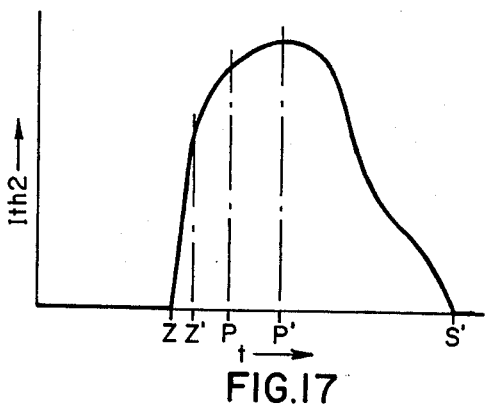
FIG. 17 shows a plot of current through the auxiliary thyristor for the circuit of FIG. 10 during the time increment shown in FIGS. 14, 15 and 16.

By referring to FIGS. 14, 15, 16 and 17 plots of the total interrupter current versus time, current through the thyristor Th1 versus time, voltage across the thyristor Th1 versus time and current through the thyristor Th2 versus time are shown. In FIGS. 14, 15, and 16 it is shown that the currents in the various paths rise as described previously with respect to FIGS. 6, 7 and 8, respectively. That is, the total interrupter current will follow the natural shape of the normal current flowing in the circuit until a point in time K is reached at which time the current through the thyristor Th1 and the total interrupter current will increase rapidly due to the presence of a fault or overload condition until a point in time Z is reached in which case the thyristor Th2 is energized causing the commutation of current from the thyristor Th1 to the thyristor Th2 after which time the overload current continues to drift upwardly following the curve M of FIG. 14 until the capacitive element C3 has fully discharged and begun to charge in the opposite direction in which case the diode D1 is actuated on thus causing the disposition of the resistive element R2 into parallel circuit relationship with the capacitive element C3. This allows the overload current to continue to drift upwardly but at a different rate. Thereafter the current limiting effect of the resistive element R2 and the now fully charged capacitive element C3 will reduce the overload current, but also maintain it at a limited level, until the next natural current zero occurs.

Figure 18:
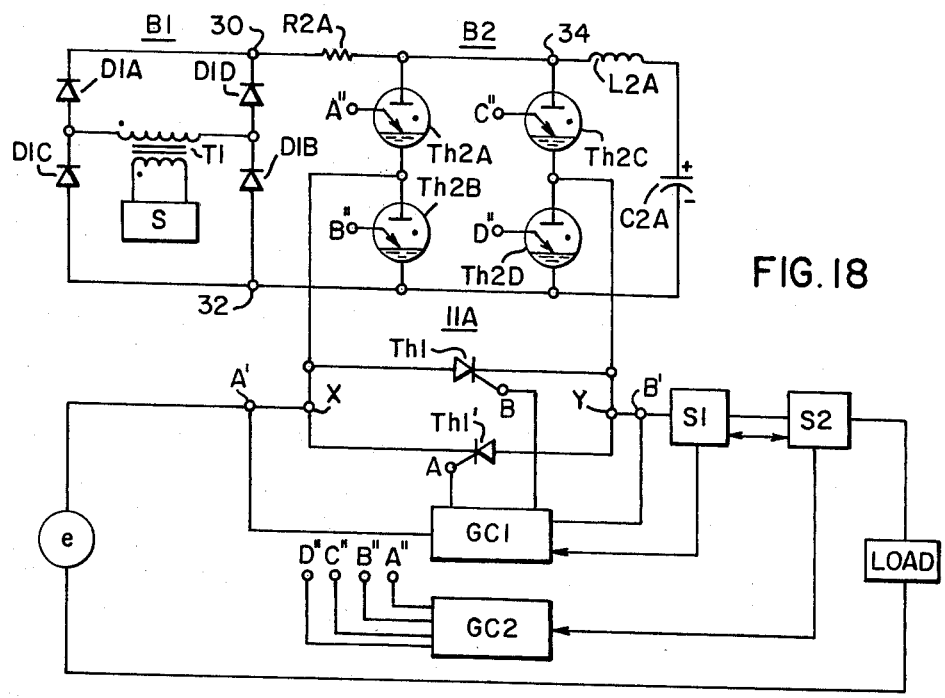
FIG. 18 shows still another embodiment of the invention.

Referring now to FIG. 18, still another embodiment of the invention is shown in which a combination charging circuit for a capacitive element C2A and switching circuit for both gated elements Th1 and Th1' is shown. In this embodiment of the invention, a power source e is once again present which may provide alternating electrical current. There is also present a load through which a load current iL flows. In series circuit relationship with the load are sensors S1 and S2, where sensor S1 supplies input signal information to a gate control circuit GC1 for actuation of either of the thyristor Th1 or thyristor Th1' as the case may be. It is to be understood that both of the thyristors Th1 and Th1' are necessary for the bidirectional current iL supplied from source e. Gate control circuit GC2, which receives its input signal from sensor S2, supplies output information at output terminals A'', B'', C'' and D'' which information is provided in proper sequence to the thyristors or ignitrons Th2A through Th2D. The sensors S1 and S2 may be interconnected as shown. The thyristors or similar gated elements Th1 and Th1' are in reverse parallel connection in series circuit relationship between the source e and the load. Connected in parallel circuit relationship with the thyristors Th1 and Th1' and between the terminals X and Y is a combination switch and current limiting device 11A. The device 11A comprises a bridge circuit B1 which includes four diodes connected in the classical full wave bridge rectifying configuration. The four diodes are designated D1A through D1D. The cathodes of the diodes D1A and D1D are connected together at a common point 30 and the anodes of the diodes D1C and D1B are connected together at a common point 32. Connected between the anode of diode D1A and the cathode of diode D1C is one end of the secondary of a transformer T1. The other end of the secondary of transformer T1 is connected to the junction between the anode of the diode D1D and the cathode of the diode D1B. The primary of the transformer T1 is connected to a source of voltage S which may be identical with source e. The bridge network B1 is available for providing charge to a capacitive element C2A, the function of which will be described hereafter. The bridge network B1 also accomplishes the purpose attributed to diode D1 of FIG. 1. Another bridge network B2 is present in device 11A. Network B2 comprises controlled rectifier elements Th2A through Th2D. In this embodiment of the invention the latter elements are shown as gas or mercury vapor rectifiers. However, it is to be understood that any controllable rectifier element such as a silicon controlled rectifier or a thyristor element may be used in the latter bridge circuit arrangement. The cathodes of the rectifiers Th2B and Th2D are connected together and to the common point or line 32. The anodes of the rectifier elements Th2A and Th2C are connected together and to the common point or line 34. The junction point X is between the cathode of the rectifier Th2A and the anode of the rectifier Th2B. The common point or junction terminal Y is between the cathode of the rectifier Th2C and the anode the rectifier Th2D. Common point 30 and common point 34 are separated by a resistive element R2A. Connected between the common points 34 and common points 32 in series circuit relationship are an inductive element L2A and the capacitive element C2A. The operation of the circuit of FIG. 18 will be described hereinafter with the aid of FIGS. 19 and 20.

Figure 19:
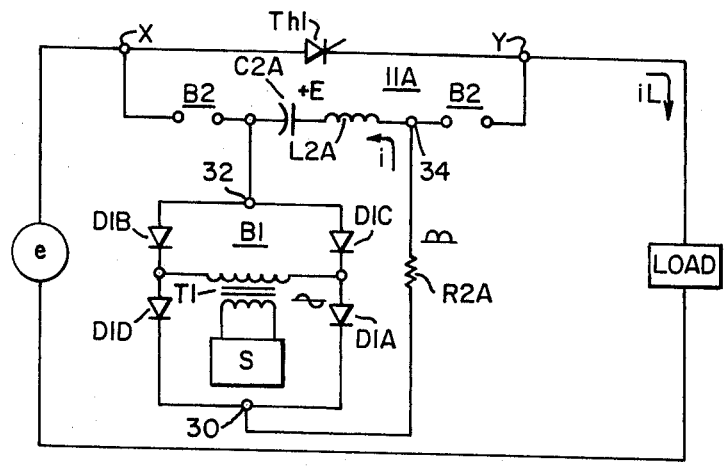
FIG. 19 shows the circuit depicted in FIG. 18 after current commutation has begun.

Referring now to FIG. 19 a simplified version of the schematic diagram of FIG. 18 is shown. In this depiction the sensors S1 and S2 and the gate control circuits GC1 and GC2 of FIG. 18 are deleted for purpose of simplicity. In addition the thyristor element Th1' is also deleted as only one half cycle of bidirectional current is presumed to be flowing through thyristor element Th1 during this time increment. This is done for the reason of simplicity of explanation. Current is supplied in the latter direction from the source e. During normal non-short circuit or non-overload conditions current iL flows through the conducting thyristor element Th1 with the circuit 11A being disconnected from the terminals X and Y. This is analogous to the normal non-overload or non-short circuit conditions for the circuits of FIGS. 1 and 10. It will be noted at this time that a source S provides bidirectional current to the secondary of the transformer T1 through the primary thereof. A unidirectional current wave is thence provided by the bridge D1A-D1E to the junction point 30, thence through the resistive element R2A to the junction point 34 and thence through the inductive element L2A to charge the capacitive element C2A to a positive voltage polarity as shown in FIG. 19. This latter current only flows until capacitive element C2A is charged to the peak DC voltage at the output terminals of the rectifier means D1A-D1D (B1). When an overload or short circuit is sensed by sensing elements (not shown), two appropriate thyristors (Th2B and Th2C) of the thyristor bridge network B2 conduct to provide an effective short circuit between the junction point X and the junction point 32, and between junction point 34 and junction point Y in a manner similar to that described with respect to the circuits shown in FIGS. 1 and 10. Within a few microseconds, the entire overload current or short circuit current iL as the case may be is commutated from the circuit including the thyristor Th1 to the circuit including the capacitive element C2A and the inductive element L2A. The inductive element L2A limits the rate of rise for the current flowing through the capacitive element C2A and the devices or thyristors of bridge circuit B2. The capacitive element C2A then provides a reverse voltage bias for the thyristor element Th1. Full load current iL is conducted through the capacitive element C2A and the inductive element L2A until the voltage across the capacitive element C2A discharges to zero and begins to charge in the reverse direction due to the effect of the overload current iL flowing therethrough.

Figure 20:
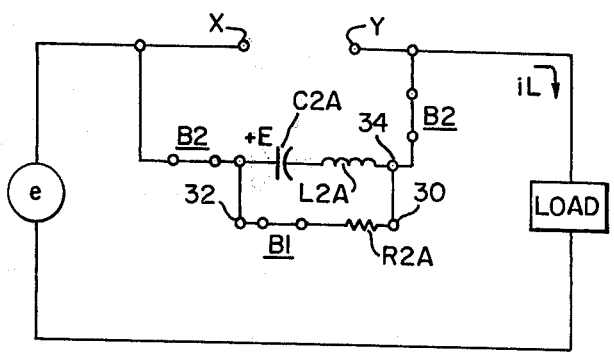
FIG. 20 shows the circuit of FIG. 18 at a greater time after current commutation has begun.

By referring now to FIG. 20 the schematic diagram of the circuit after the previously described voltage condition for the capacitive element C2A has been reached is shown. It will be noted that the thyristor element Th1 is non-conducting as is evidenced by the apparent void or open circuit between the terminals X and Y. The inductive element L2A provides substantially no current limiting action as it is present for the purpose of preventing rapid rise of current through the elements of the bridge circuit B2 initially rather than for providing current limiting action. The bridge circuit B1 is now virtually short circuited and the resistive element R2A is provided in parallel circuit relationship with the series circuit comprising the capacitive element C2A and the inductive element L2A. The remainder of the operation of the circuit is similar to that described with respect to the circuit of FIG. 10. Therefore, as was the case with respect to circuit of FIG. 10 the resistive element R2A also sustains the current for a predetermined period of time until the next natural current commutation occurs thus sustaining a limited overload current iL to allow slower reacting system protective devices to be actuated to a condition for protecting the system. Because of the unique arrangement of the diode elements of the diode circuit B1 and the gated control elements of the bridge circuit B2 the capacitive element C2A may always be charged by current flowing in one direction and discharged in the opposite direction even though the thyristor elements Th1 and Th1' as shown in FIG. 18 may be alternately operative during a short circuit or overload condition. This allows the capacitive element C2A to be utilized with proper polarity between the terminals X and Y for providing current commutation and current limitation regardless of which thyristor Th1 or Th1' is conducting. It should be noted that after current iL, limited by R2A, reaches a natural current zero, the conducting thyristors Th2B and Th2C devices will turn off and block reversal of current. If it is desired that the limited current iL continue to flow for an additional half cycle (for allowing other protective devices to operate), thyristors Th2A and Th2D must be fired to permit the reverse half cycle of current iL to flow and then thyristors Th2B and Th2C must be fired again for the next half cycle until the other protective devices have operated.

With respect to the circuits of FIGS. 1, 10 and 18, the gate control circuits GC1 and GC2 maintain the circuit elements Th1 or Th1' as the case may be in a non-fired or non-actuated state for a time after an overload or short circuit current iL has been sensed. Naturally, when the short circuit or overload current, iL is removed the sensors may cooperate with the gate control circuits which in turn may cooperate with the various thyristors or controlled gates, silicon controlled rectifiers, ignitrons or any other controllable rectifier devices as the case may be to provide normal operating conditions for the circuits shown herein.

It is to be understood that the circuits shown herein may be adapted for use with polyphase circuitry. It is also to be understood that the load may comprise an inductive, capacitive or resistive load or any combination thereof. It is also to be understood that the sources of voltage generally designated E or e are not limited to sinusoidal sources of voltage nor are they limited to 50 or 60 hertz alternating current or pulsating unidirectional current sources. It is also to be understood that the various thyristor elements may be replaced by other similarly acting gated control circuits as has been previously described including but limited to silicon controlled rectifiers, thyristors and the like. It is also to be understood that the values of time and of circuit parameters described herein are not limiting, but merely illustrative. It is also to be understood that the transformer T1 of FIGS. 18–20 should have a substantial impedance associated therewith either internally or otherwise, so that T1 will not be damaged when it operates with its secondary winding shorted. It is also to be understood that the load described in the specification and claims may be a source of electrical power. Such a case may occur when two sources of power are interconnected with and embodiment of the invention in the same electrical system.

The circuits described herein and the embodiments described herein have many advantages, one of which lies in the fact that the inductive elements generally designated L1 in FIG. 1, L2 in FIG. 10 and L2A in FIG. 18 need only be of an electrical quality and characteristic to limit the rate of rise of current which flows through the thyristor element connected in series therewith, such as Th2 in FIG. 1. In this sense is to be realized that the inductive elements previously described are not the primary means for limiting the overload current and consequently may be of a less substantial electrical characteristic. It is also to be understood that the diode elements D1 in FIGS. 1 and 10 and the diode bridge B1 in FIG. 18 are passive elements and need no external gate control, thus further minimizing the complexity and need for synchronization between gate control circuits and the various circuit elements which they control during a switching or an overload cycle or operation. Another advantage lies in the fact that early interruption of overload current without undue overvoltage can occur in this circuitry because of the sequential introduction of current limiting devices or means during the overload or current limiting cycle, as an example, the forward biasing of the diode D1 in FIG. 1 to connect the capacitive element C2 and the resistive element R for the simultaneous function of limiting current iL and damping the voltage across thyristor Th1. In addition another advantage lies in the fact that current limiting can occur without introducing high voltage transients across switch terminals X–Y or across the load. Another advantage lies in the fact that the resistive element R2 such as is shown in FIG. 10 allows for effective current limiting of an overload or short circuit current iL while sustaining that current for a period of time sufficient to allow other slower reacting circuit or system elements to act to protect the system in a more permanent manner. As an example of this, a slower reacting mechanical circuit breaker may be energized or activated by the sustained current iL as current iL is limited by the resistive element R2 to thereby cause the separable main contacts of the circuit breaker to open. Another advantage lies in the fact that the sensors of this circuit, such as S2 may sense not only the maximum current that is applied or flows through the load or system but also the rate of change of current and therefore the gate control circuits GC1 and GC2 which cooperate with the various circuit element gates may cause switching off in anticipation of overload current before damage can occur. Another advantage lies in the fact that the circuit of FIG. 18 includes a capacitor charging circuit therein as exemplified by the transformer T1 and the bridge circuit B1 which acts to charge the capacitive element C2A at convenient times but which nevertheless does not act to materially detrimentally effect the current limiting characteristics of the circuit described in FIG. 18. In addition this bridge circuit performs the additional function of acting as a diode for a portion of the current limiting circuit operation.

What we claim as our invention is:

1. A current limiting device, comprising:
   A. terminals adapted to be connected in circuit relationship in an electrical system with a load and a source of voltage;
   B. main circuit means disposed between said terminals for conducting electrical current in said electrical system;
   C. commutating circuit means connected between said terminals generally in parallel circuit relationship with said main circuit means, said commutating circuit means comprising:
      1. controllable switch means which is actuated to conduct at least a portion of said current in said electrical system when said current flowing in said electrical system attains a predetermined condition;
      2. blocking and current limiting means connected in circuit relationship with said controllable switch means for causing said main circuit means to cease to conduct after said controllable switch means has been actuated to thereby cause said commutating current means to conduct substantially all of said current in said electrical system and to limit said current;
      3. supplemental capacitive current limiting means connected in circuit relationship with said blocking means and said controllable switch means for further limiting said electrical current in said system;
      4. generally passive diode means connected in circuit relationship with said current limiting means said controllable switch means and said blocking means, said passive diode means being forward biased by said blocking means in response to a predetermined amount of said system current flowing in said blocking means after said blocking means has caused said main circuit to cease to conduct to thereby cause said supplemental current limiting means to conduct a significant portion of said current in said electrical system to thereby limit said current in said system to a predetermined maximum value.

2. The combination as claimed in claim 1 wherein said current which flows in said commutating circuit means is to rise at no greater a rate than a predetermined value, a rate limiting means for said commutating circuit means, said rate limiting means being connected in circuit relationship with said controllable switch means, said blocking means and said current limiting means generally solely for the purpose of allowing said current which flows in said commutating circuit to rise at a rate no greater than said predetermined value.

3. The combination as claimed in claim 2 wherein said rate limiting means comprises an inductance choke coil.

4. The combination as claimed in claim 1 wherein said blocking means comprises a storage capacitance element.

5. The combination as claimed in claim 4 wherein said generally passive diode means comprises a source of charging electrical current connected in circuit relationship with a diode bridge for providing electrical charging current to charge said storage capacitive element through said supplemental current limiting means to a predetermined voltage value with a predetermined voltage polarity during a period of time when said controllable switch is not actuated to conduct said portion of said current flowing in said electrical system.

6. The combination as claimed in claim 1 wherein said supplemental capacitance current limiting means comprises a second capacitive element which is charged by said current flowing therethrough to thereby develop a voltage thereacross which is in polarity opposition to said current flowing therethrough and which thereby limits said current.

7. The combination as claimed in claim 1 including a supplemental protective device connected in circuit relationship with said terminals, said supplemental capacitive current limiting means comprising a resistive element which limits said current flowing in said supplemental current limiting means but nevertheless allows said current to be sustained within safe limits to thus allow said supplemental protective device to operate.

8. The combination as claimed in claim 1 wherein said commutating circuit is bidirectional, said current in said electrical system also being bidirectional, said main circuit means also being bidirectional for conducting alternate portions of said bidirectional electrical current in said electrical system, said bidirectional commutating circuit cooperating with said bidirectional main circuit means and said passive diode means to commutate and limit said alternate portions of said bidirectional electrical current.

9. The combination as claimed in claim 8 which said bidirectional electrical current comprises alternating current.

10. The combination as claimed in claim 1 wherein said supplemental capacitive current limiting means comprises a resistive element which limits said current flowing in said supplemental current limiting means.

11. The combination as claimed in claim 1 wherein said supplemental capacitive current limiting means comprises a resistive element and a second capacitive element connected in circuit relationship, said second capacitive element being charged by a portion of said current flowing through said supplemental capacitive current limiting means to thereby develop a voltage thereacross which is in polarity opposition to said later portion of current and which therefore limits said current in said electrical system, said resistive element also limiting said current in said electrical system.

12. The combination as claimed in claim 11 wherein said circuit relationship of said resistive element and said second capacitive element comprises a series circuit relationship.

13. The combination as claimed in claim 1 wherein said controllable switch means comprises a thyristor which is turned off until reactuated at the gate terminal thereof when said current through the main terminals thereof is generally reduced to zero by current limiting action.

14. The combination as claimed in claim 1 wherein said controllable switch means is connected in series circuit relationship with said blocking means, said supplemental current limiting means is connected in series circuit relationship with said passive diode means, said latter series combination being connected in parallel circuit relationship with said blocking means.

* * * * *